United States Patent
Sriram

(10) Patent No.: US 7,403,516 B2
(45) Date of Patent: Jul. 22, 2008

(54) ENABLING PACKET SWITCHED CALLS TO A WIRELESS TELEPHONE USER

(75) Inventor: Sundar Ranganathan Sriram, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 910 days.

(21) Appl. No.: 10/452,331

(22) Filed: Jun. 2, 2003

(65) Prior Publication Data

US 2004/0240441 A1 Dec. 2, 2004

(51) Int. Cl.
*H04L 12/66* (2006.01)
*H04L 12/56* (2006.01)
*H04L 12/28* (2006.01)

(52) U.S. Cl. .................... 370/352; 370/392; 370/401

(58) Field of Classification Search ........... 370/389, 370/402, 401, 313, 352, 392
See application file for complete search history.

(56) References Cited

U.S. PATENT DOCUMENTS

| | | | | |
|---|---|---|---|---|
| 6,519,242 B1 * | 2/2003 | Emery et al. | ...... | 370/338 |
| 6,603,761 B1 * | 8/2003 | Wang et al. | ...... | 370/352 |
| 6,735,209 B1 * | 5/2004 | Cannon et al. | ...... | 370/401 |
| 6,879,680 B2 * | 4/2005 | Donovan et al. | ...... | 379/220.01 |
| 6,885,871 B2 * | 4/2005 | Caloud | ...... | 455/466 |
| 2004/0223488 A1 * | 11/2004 | Roy | ...... | 370/352 |

* cited by examiner

*Primary Examiner*—Seema S. Rao
*Assistant Examiner*—Mon Cheri S Davenport

(57) ABSTRACT

A packet switched IP call to a mobile user device in a wireless network is supported where the mobile user does not have a static IP address and where the mobile user is not engaged in communications in which an IP address is currently assigned. The originating party utilizes the directory number of the mobile user to initiate the packet switched call with at least an originating packet being directed to a home agent in the wireless network. The home agent assigns a temporary IP address to the mobile user's UE and translates packets addressed to the user's directory number to the assigned IP address. A switching node forwards the assigned IP addressed packets to the corresponding UE.

3 Claims, 3 Drawing Sheets

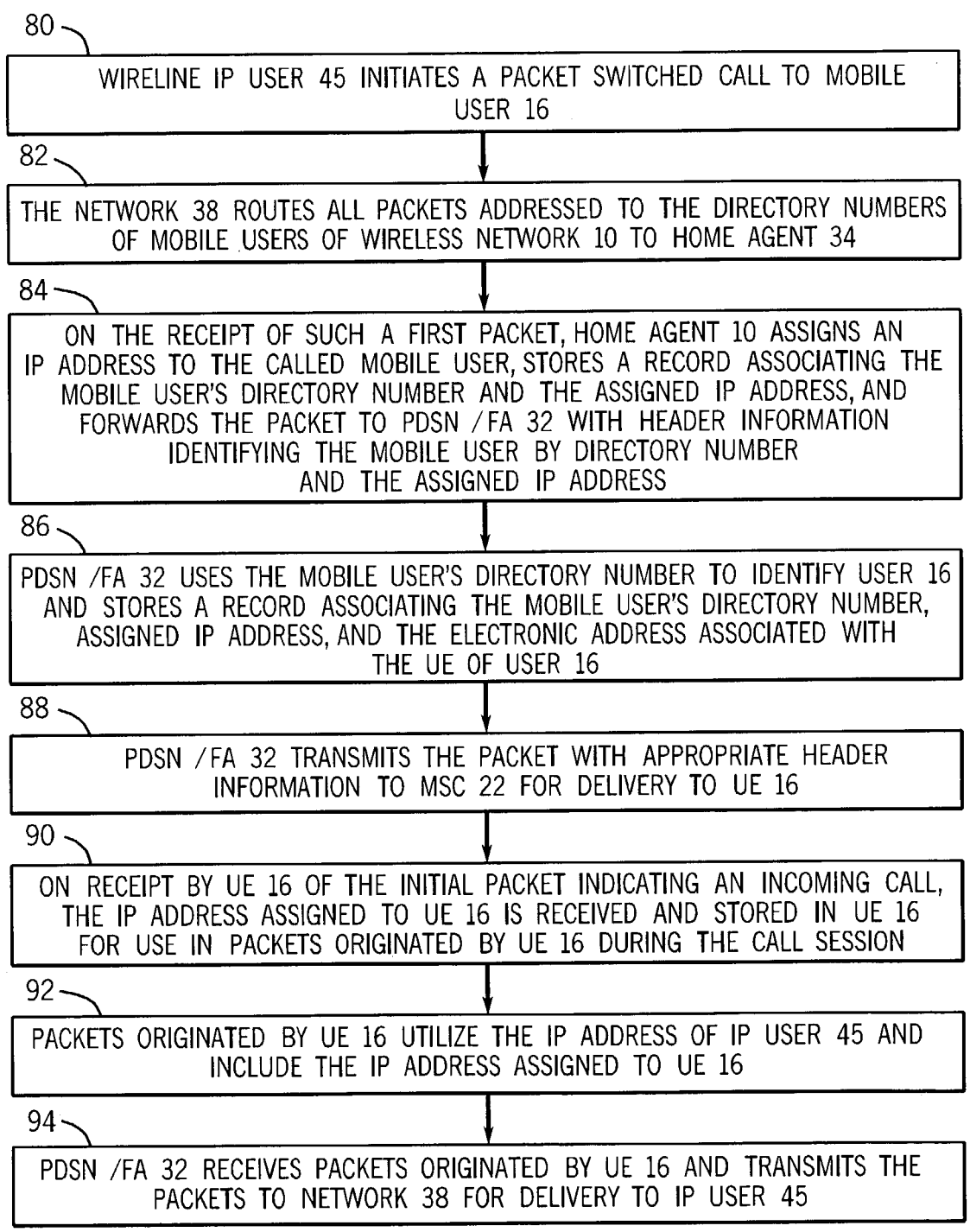

ENABLING PACKET SWITCHED CALLS TO A WIRELESS TELEPHONE USER

BACKGROUND

This invention relates to wireless telephone networks and more specifically relates to a wireless network utilizing packet switching and Internet protocol (IP) packets to provide communications with wireless telephone users that do not have a static IP address.

Wireless telephone networks continue to evolve. In the United States, wireless telephones in the public switched telephone system (PSTN) began with the mobile telephone system (MTS) that utilized lower frequencies for radio frequency transmissions and carried voice communications by analog signals. The MTS was spectrally inefficient in that a single frequency or channel was used to cover communications over a large geographic area. The wireless cellular telephone system provided an improvement by utilizing the concept of smaller geography cells that allowed communication channel frequencies to be reused in relatively nearby cells. The cellular system evolved from carrying communications by analog signals to digital signals. Various types of digital signaling have been, and continue to be, utilized including time division multiple access (TDMA) and code division multiple access (CDMA) signaling. With the growing popularity of the Internet and the use of IP addressing for routing packets to a destination device, many wireless devices accommodate both voice communications using a digital signaling protocol and data communications using packets with IP addressing.

As networks continue to evolve, some networks, e.g. third generation universal mobile telecommunications systems (3G—UMTS), offer voice communications carried by packet switching and IP addressing. Due to limitations of the current IP addressing scheme (version 4), it is not possible to assign unique static IP addresses to all devices on the Internet. Where a mobile user desires to initiate a call using packet switching and does not have a static IP address assigned, a dynamic IP address can be assigned using dynamic host configuration protocol (DHCP) or other mechanisms to identify the mobile user during the call session. An IP address for the mobile user is required since packets carrying communications from the called party (a network user) to the originating mobile user will utilize the mobile user's IP address for return packets carrying communications to the mobile user. However, difficulties arise when it is desired to originate a packet switched call from a network user to a mobile user that does not have an assigned static IP address. Unless the mobile user's device is registered and has been assigned a dynamic IP address prior to the initiation of the packet switched call to the user, such calls cannot be made since an IP address of the mobile user's device is not available to the packet switch even though the originating party may know the directory telephone number (DN) of the mobile user. Thus, there exists a need for a solution to this problem.

SUMMARY OF THE INVENTION

It is an object of the present invention to provide an improved method that provides a solution to this problem.

In accordance with an embodiment of the invention, a method is provided for supporting a packet switched IP call to a mobile user device in a wireless network where the mobile user does not have a static IP address and where the mobile user is not engaged in communications in which an IP address is currently assigned. The originating party utilizes the directory number of the mobile user to initiate the packet switched call with at least an originating packet being directed to a home agent in the wireless network. The home agent assigns a temporary IP address to the mobile user's UE and translates packets addressed to the user's directory number to the assigned IP address. A switching node forwards the assigned IP addressed packets to the corresponding UE.

BRIEF DESCRIPTION OF THE DRAWING

FIG. 3 is a flow diagram illustrating an exemplary method for enabling packet switched calls to an IP enabled mobile user as the called party.

DETAILED DESCRIPTION

Figure 1:
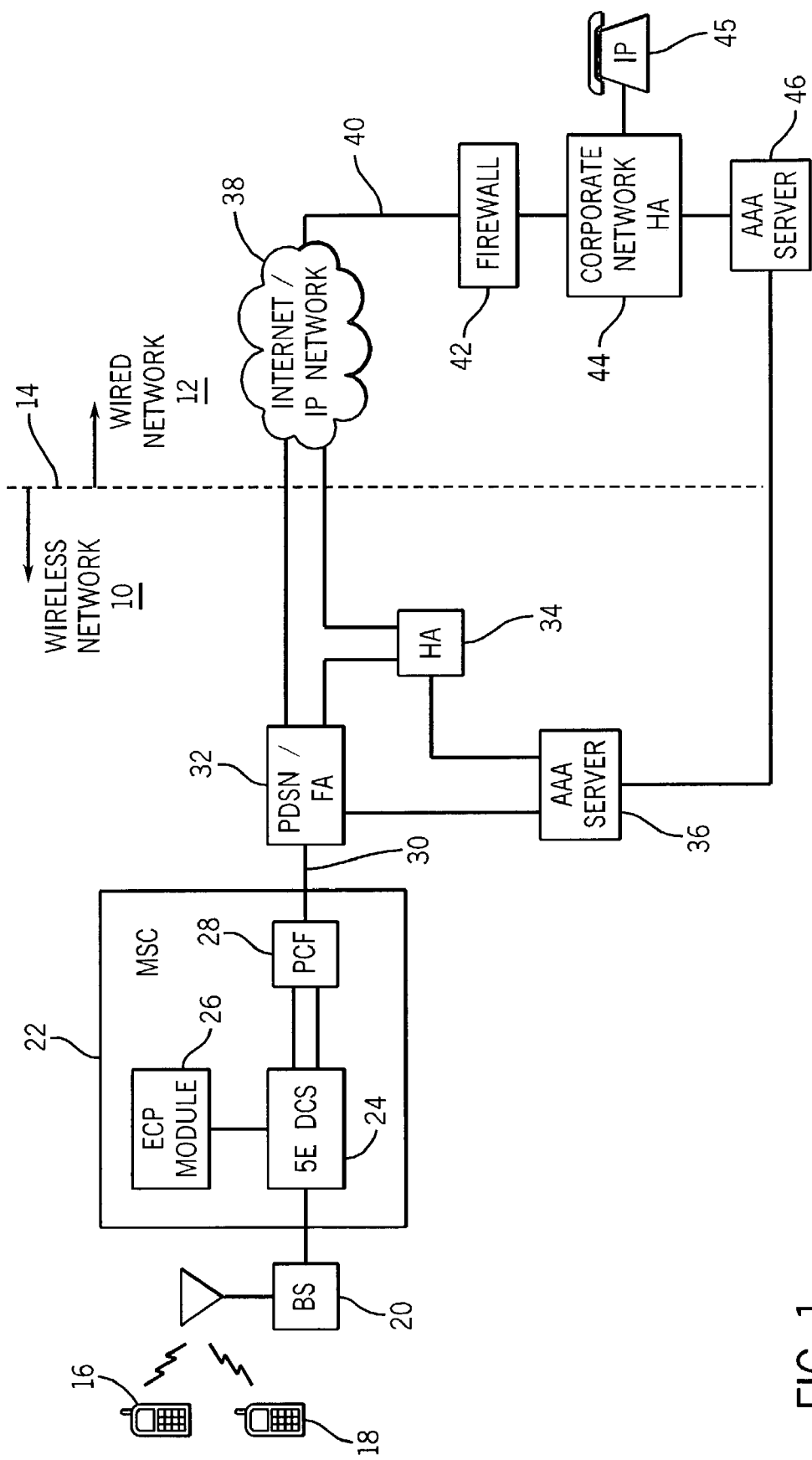
FIG. 1 is a block diagram of an embodiment of a system that supports an exemplary method in accordance with the present invention.

FIG. 1 shows an exemplary system including a wireless network 10 and a wired network 12, the networks shown as separated by the dashed line 14. Wireless users'equipment (UE) 16 and 18 support wireless packet communications and each has an assigned directory telephone number in the wireless network 10. A base station (BS) 20 supports radio frequency communications between the UEs and mobile switching center (MSC) 22. The MSC 22 may include a 5E digital cellular switch (DCS) 24 that is supported by an enhanced communication protocol (ECP) module 26 that assists in interfacing the digital switch with different communication protocols. A packet carrying function (PCF) 28, also known as an interworking function, provides an interface to the known radio-packet protocol standard on communication channel 30. The MSC 22 is commercially available from Lucent Technologies Inc.

A packet data serving node (PDSN) 32 includes a foreign agent (FA) capability, and may comprise a SpringTide 7000 Wireless IP Service Switch. The purpose of the FA is to serve as a default router for mobile units while they are connected to foreign networks. The PDSN/FA in combination with the radio-packet interface supported by the PCF permits an IP mobile unit to be able to cross MSC boundaries without impacting the user session, i.e. the same IP address and the same PDSN can be maintained throughout the session assuming that all serving PCFs have network connections to the same PDSN.

The PDSN/FA 32 is also coupled to a home agent (HA) 34 that serves as a home host for all wireless mobiles served by the wireless network 10. HA 34 can comprise SpringTide 7000 Wireless IP Service Switch that includes a home agent capability. As will be described in greater detail below, the mobile units must register with the HA that stores both directory number and an assigned IP address identifying each mobile unit. The authentication, authorization and accounting (AAA) server 36 is coupled to and supports PDSN/FA 32 and HA 34 with authentication, authorization and accounting services.

The PDSN/FA 32 and HA 34 are connected to the Internet/IP network 38 to provide a transition to the wired network 12. A communication channel 40 connects network 38 with corporate network home agent 44 via firewall 42. The corporate network home agent 44 may also serve a plurality of directly connected IP users, e.g. IP packet phone 45, that may be connected in a corporate local area network environment. An AAA server 46 provides authentication, authorization and accounting services for corporate network home agent 44, and is connected to AAA server 36 in order to share supporting information concerning users and calls made.

With an exemplary architecture having been described, an overview of an embodiment of a method in accordance with the present invention will be better understood. Assume a packet switched call is desired to be originated by IP phone user 45 to mobile user 16 of wireless network 10. The mobile user 16 does not have a unique static IP address assigned and does not have a currently assigned IP address since IP services are not being utilized, but does have assigned normal telephone directory number that is known to the call originator. The user of IP phone 45 initiates a call to the directory number of mobile unit 16. The call request is made through network 38 and is delivered to the centralized HA 34 for wireless network 10. After determining that the requested directory number is for a valid subscriber (UE 16) of wireless network 10, HA 34 assigns a first IP address for use by UE 16 that will be unique within a virtual private network (VPN) of subscribers of wireless network 10, but may not be a unique IP address outside of the VPN. The HA 34 then transmits a message to PDSN/FA 32 indicating the first IP address is to be associated with UE 16. The HA 34 then causes PDSN/FA 32 to initiate an incoming call set up message transmitted by MSC 22 to UE 16; this includes the IP address of IP phone 45 so that UE 16 can send packets to the calling party. Assuming that the user of UE 16 answers the incoming call, packets from the originating party will traverse the path to HA 34 based on addressing associated with the directory telephone number. In HA 34 the packets from the originating party are re-addressed or translated to the first IP address and sent to PDSN/FA 32 in order to reach UE 16 using the assigned first IP address. Packets transmitted by the user of UE 16 to the originating party will traverse PDSN/FA 32 and be directly transmitted to Internet 38 using the destination IP address of IP phone 45 without traversing HA 34. There is no requirement for packets transmitted from UE 16 to traverse HA 34 since the IP address of IP phone 45 is known to UE 16. At the conclusion of the packet switched call, the first IP address temporarily assigned to UE 16 by HA 34 will be released, i.e. UE16 will no longer be associated with the first IP address.

Packet switched calls originating from a mobile UE do not experience the IP addressing issue associated with calls to the UE since the UE will normally be assigned an IP address such as by DHCP upon registering and requesting service from the wireless network. Thus, an IP address will be available to identify the UE to the called party so that return packets (communications) can be sent to the IP address of the UE.

Figure 2:
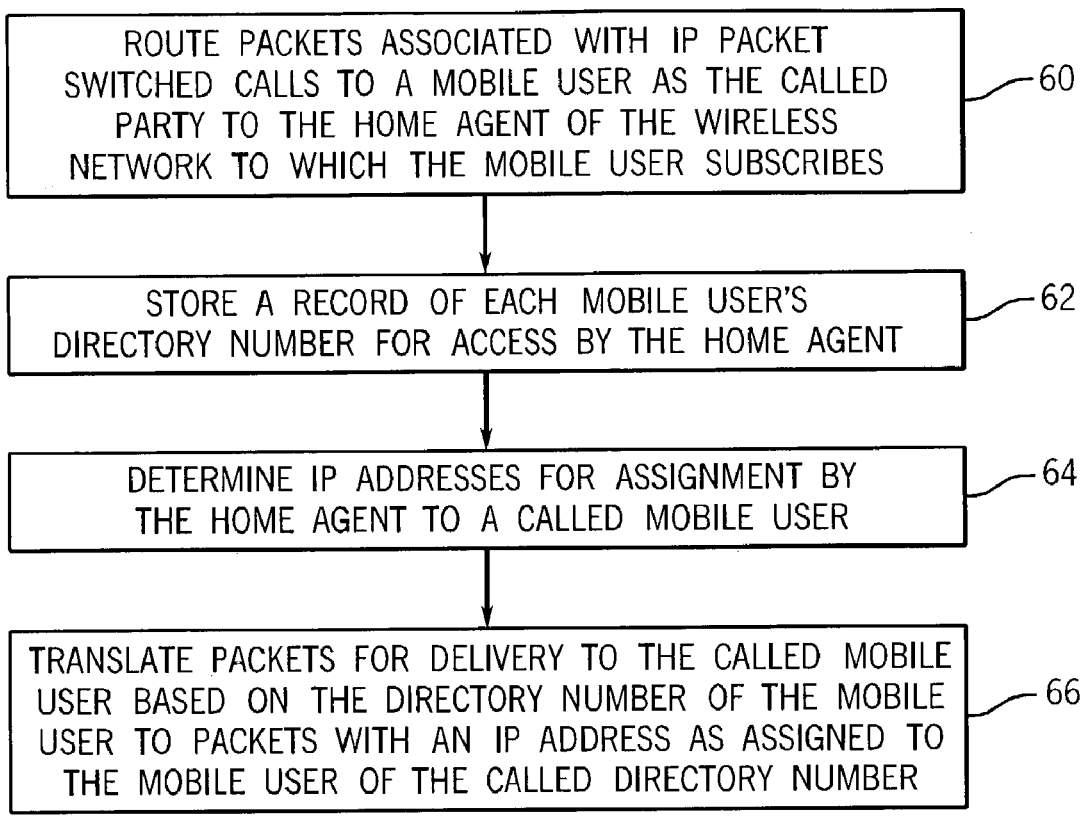
FIG. 2 is a flow diagram illustrating an exemplary method for implementing a VPN in a wireless network with IP addresses for assignment to mobile users that are unique within the VPN.

FIG. 2 is a flow diagram of an exemplary method for configuring the wireless network to accommodate packet switched calls to a mobile user of the wireless network. In step 60 IP packets associated with a packet switched call to the mobile user are routed to the home agent of the wireless network to which the mobile user subscribes. A record is stored for each mobile user's directory number in a database that can be accessed by the home agent in step 62; the database can, by need not be, integrated as part of the home agent. Upon the initial request for an IP packet switched call to a mobile user, the home agent assigns an IP address to the mobile user that will be used during the call session at step 64. Packets from the calling party for delivery to the mobile user are at least initially addressed to the mobile user based on the mobile user's directory number. Such packets are routed to the home agent where the address of each packet is translated from the mobile user's directory number to the IP address assigned by the home agent for use by the mobile user during the call session at step 66. This configuration of the wireless network permits packet switched calls to be made to a mobile user where the mobile user does not have a static IP address.

FIG. 3 is a flow diagram of an exemplary method of a packet switched IP call originating from UE 45 to the wireless user associated with UE 16. In order to focus on the exemplary method, conventional steps associated with setting up the call will not the discussed. For example, various authentication, accounting and administration functions/steps associated with the call are omitted for clarity. In step 80 wireline IP user 45 initiates a packet switched call to mobile user 16 by using the directory number of the mobile user. The network 38 routes all packets addressed to the directory numbers of mobile users of wireless network 10 to home agent 34 in step 82. On receipt of such a first packet, home agent 10 in step 84 assigns an IP address to the called mobile user, stores in a record associated the mobile user's directory number the assigned IP address, and forwards the packet to PDSN/FA 32 with header information identifying the mobile user by directory number and the assigned IP address. In step 86 the PDSN/FA 32 uses the mobile user's directory number to identify UE 16 and stores in a record associated the mobile user's directory number, the assigned IP address and electronic address associated with UE 16. The PDSN/FA 32 transmits the packet with an appropriate header to MSC 22 for delivery to UE 16 in step 88. On receipt by UE 16 of the initial packet indicating an incoming call, the IP address assigned to UE 16 is received and stored in UE 16 for use in packets originated by UE 16 during the call session in step 90. As indicated in step 92, packets originated by UE 16 utilize the IP address of IP user 45 and include the IP address assigned to UE 16. The PDSN/FA 32 receives packets originated by UE 16 and transmits packets to network 38 for delivery to IP user 45 in step 94. It will be noted that packets transmitted by UE 16 to IP user 45 are not required to pass through home agent 34. Home agent 34 does not have to be involved in the transmission of packets from UE 16 to IP user 45 since the IP address of user 45 is known to UE 16 by the receipt of an initial packet originated by IP user 45. Additional packets originated by IP user 45 for UE 16 that are addressed to the directory number of UE 16 will be routed to HA 34 where address translation will occur to change the directory number addressing to the assigned IP addressing of UE 16.

Figure 4:
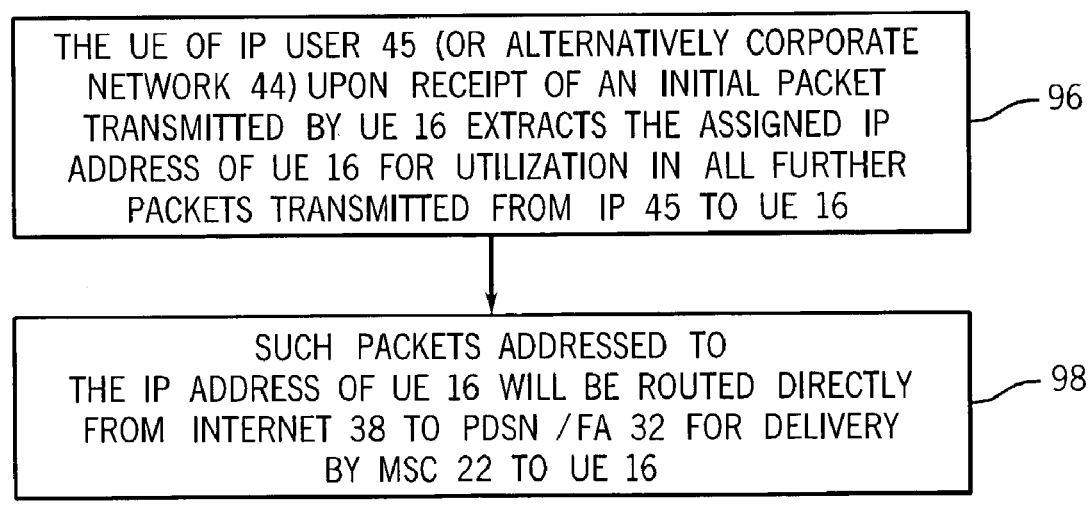
FIG. 4 is a flow diagram illustrating alternative exemplary steps for use with the method of FIG. 3.

FIG. 4 is a flow diagram illustrating an alternative exemplary method that is substantially identical to the method described in FIG. 3 except for the steps as described in FIG. 4. In step 96 the UE of IP user 45 upon receipt of an initial packet transmitted by UE 16 extracts the assigned IP address from the received header of the packet for utilization in all further packets transmitted from IP 45 to UE 16. Alternatively, the corporate network 44 extracts the assigned IP address from the received header of the packet from UE 16 and utilizes the extracted IP address for all further packets originated by IP user 45 for UE 16. In step 98 packets originating from user 45 addressed to the assigned IP address of UE 16 will be routed directly from Internet 38 to PDSN/FA 32 for delivery by MSC 22 to UE 16. That is, since the packets are already addressed to the IP address associated with UE 16 that is known to PDSN/FA 32, there is no requirement to direct such packets through HA 34.

Various modifications can be made to the embodiments. For example, the home agent of the wireless network can be physically integrated with a packet data switching node/foreign agent in a single element. Records required by the packet data switching node/foreign agent and home agent can be stored in a database integrated as part of each element, or can be stored in a separate database that can be accessed as required. It will be apparent to those skilled in the art that the corporate network will typically serve a plurality of IP phone users connected by a local or wide area network. The wireless users' IP enabled equipment may consist of a variety of electronic devices utilizing different operating systems and wireless communication protocols. Instead of the PBSN/FA correlating the electronic identification number of the UE with the assigned IP packets addressed to the UE, the MSC could provide this function.

Although an embodiment of all the present invention is described above and shown in the drawings, the scope of the invention is defined by the claims that follow.

I claim:

1. A method for establishing packet switched calls over a wireless network to wireless mobile users that do not have static internet protocol addresses and do not have a currently assigned internet protocol address, the method comprising the steps of:

identifying by a home agent in the wireless network a called mobile user to receive at least initial packets in a packet switched call from an originator not in the wireless network, the packets addressed to a directory telephone number assigned to the called mobile user;

assigning by the home agent a first internet protocol address to the called mobile user in response to receipt of said at least initial packets where the first internet protocol address was not associated with the called mobile user prior the receipt of said at least initial packets, the first internet protocol address being unique within a virtual private network of the wireless network, no internet protocol address having been assigned for use by the called mobile user prior the receipt of said at least initial packets;

inserting by the home agent the first internet protocol address in the at least initial packets;

routing by the home agent the at least initial packets including the first internet protocol address to the called mobile user;

storing the first internet protocol address in a wireless device used by the mobile user and using the first internet protocol address as an originating party internet protocol address in packets transmitted by the called mobile user during the call;

receiving all further packets from the originator by the home agent addressed to the mobile user using the directory number of the mobile user;

translating by the home agent the further packets addressed to the directory number into inbound packets having the first internet protocol address, and forwarding the inbound packets to wireless device of the mobile user using the first internet protocol address;

transmitting outbound packets from the wireless device of the mobile user to the originator using a destination internet protocol address of the originator such that the home agent is not an intermediate node in the transmission of the outbound packets.

2. A method for establishing packet switched calls over a wireless network to wireless mobile users that do not have static internet protocol addresses and do not have a currently assigned internet protocol address, the method comprising the steps of:

identifying by a home agent in the wireless network a called mobile user to receive at least initial packets in a packet switched call addressed to a directory telephone number assigned to the called mobile user;

assigning by the home agent a first internet protocol address to the called mobile user in response to receipt of said at least initial packets where the first internet protocol address was not associated with the called mobile user prior the receipt of said at least initial packets, the first internet protocol address being unique within a virtual private network of the wireless network, no internet protocol address having been assigned for use by the called mobile user prior the receipt of said at least initial packets;

inserting by the home agent the first internet protocol address in the at least initial packets;

routing the at least initial packets including the first internet protocol address to the called mobile user;

storing the first internet protocol address in a wireless device used by the mobile user and using the first internet protocol address as an originating party internet protocol address in packets transmitted by the called mobile user during the call, wherein said directory number is included in all packets sent to the called mobile user arriving at the home agent, and the home agent inserts the first internet protocol address in all packets sent to the mobile user.

3. The method according to claim 2 further comprising the steps of upon receipt by a device associated with a party that originated the call to the mobile user of the packet transmitted by the called mobile user during the call, storing the first internet protocol address assigned to the called mobile user, and incorporating the first internet protocol address in further packets sent to the mobile user.

* * * * *